(12) United States Patent
Morris et al.

(10) Patent No.: US 7,540,083 B2
(45) Date of Patent: Jun. 2, 2009

(54) METHOD TO MODIFY AN AIRFOIL INTERNAL COOLING CIRCUIT

(75) Inventors: Mark C. Morris, Phoenix, AZ (US);
Jason C. Smoke, Phoenix, AZ (US);
William J. Weidner, Mesa, AZ (US);
Craig A. Wilson, Mesa, AZ (US);
Edward J. Mayer, Hamilton, OH (US)

(73) Assignee: Honeywell International Inc., Morristown, NJ (US)

( * ) Notice: Subject to any disclaimer, the term of this patent is extended or adjusted under 35 U.S.C. 154(b) by 547 days.

(21) Appl. No.: 11/238,528

(22) Filed: Sep. 28, 2005

(65) Prior Publication Data

US 2008/0000082 A1   Jan. 3, 2008

(51) Int. Cl.
   *B21K 3/04*   (2006.01)
(52) U.S. Cl. ............ 29/889.72; 29/889.7; 29/889.721; 29/889.722; 416/96 R; 416/97 R
(58) Field of Classification Search .......... 29/402.01, 29/402.09, 402.13, 402.16, 402.19, 557, 29/558, 889.7, 889.72, 889.721, 889.722; 416/96 R, 97 R
See application file for complete search history.

(56) References Cited

U.S. PATENT DOCUMENTS

| | | | |
|---|---|---|---|
| 4,305,697 A | 12/1981 | Cohen et al. | |
| 4,953,776 A * | 9/1990 | Fraser | 228/119 |
| 5,092,942 A | 3/1992 | Fraser et al. | |
| 5,446,673 A * | 8/1995 | Bauer et al. | 700/195 |
| 5,511,721 A * | 4/1996 | Demo et al. | 228/216 |
| 5,535,498 A | 7/1996 | Roberts et al. | |
| 6,109,869 A | 8/2000 | Maddaus et al. | |
| 6,120,244 A * | 9/2000 | Fukura | 415/115 |
| 6,193,465 B1 * | 2/2001 | Liotta et al. | 416/96 A |
| 6,199,746 B1 * | 3/2001 | Dupree et al. | 228/119 |
| 6,427,327 B1 | 8/2002 | Bunker | |
| 6,453,557 B1 | 9/2002 | Burdgick | |
| 6,508,000 B2 | 1/2003 | Burke et al. | |
| 6,575,702 B2 | 6/2003 | Jackson et al. | |
| 6,782,596 B2 | 8/2004 | Miller | |
| 6,914,214 B2 * | 7/2005 | Byrd et al. | 219/121.71 |
| 7,104,966 B2 * | 9/2006 | Shiber | 600/585 |
| 7,162,789 B2 * | 1/2007 | Day et al. | 29/525.01 |
| 2003/0167616 A1 | 9/2003 | Harding et al. | |
| 2005/0217110 A1 * | 10/2005 | Topal | 29/889.1 |
| 2006/0042084 A1 * | 3/2006 | Hudson et al. | 29/889.72 |

* cited by examiner

*Primary Examiner*—David P. Bryant
*Assistant Examiner*—Ryan J Walters
(74) *Attorney, Agent, or Firm*—Ingrassia Fisher & Lorenz, P.C.

(57) ABSTRACT

Methods are provided for modifying an airfoil internal cooling circuit that include a flow path configured to direct air through the airfoil in a direction and the airfoil having a leading edge, a trailing edge, and a first and a second wall therebetween, each wall having an inner and an outer surface, the inner surfaces defining a cavity and having features forming at least a portion of the internal cooling circuit. The methods may include the steps of forming a pilot hole through the airfoil first and second walls at a predetermined location, forming an insert hole based on the predetermined location, the insert hole enveloping the pilot hole and configured to receive at least a portion of an insert configured to modify the internal cooling circuit flow path, placing the insert into the insert hole, and bonding the insert to the airfoil first and second walls.

20 Claims, 5 Drawing Sheets

METHOD TO MODIFY AN AIRFOIL INTERNAL COOLING CIRCUIT

STATEMENT REGARDING FEDERALLY SPONSORED RESEARCH OR DEVELOPMENT

This invention was made with Government support under DAAJ02-94-C-0030 awarded by the United States Army. The Government has certain rights in this invention.

TECHNICAL FIELD

The present invention relates to airfoil internal cooling circuits and, more particularly, to methods for modifying airfoil internal cooling circuits.

BACKGROUND

Gas turbine engines, such as turbofan gas turbine engines, may be used to power various types of vehicles and systems, such as, for example, aircraft. Typically, these engines include turbine blades (or airfoils) that are impinged by high-energy compressed air that causes a turbine of the engine to rotate at a high speed. Consequently, the blades are subjected to high heat and stress loadings which, over time, may reduce their structural integrity.

Modern aircraft jet engines have employed internal cooling systems in the blades to maintain the blade temperatures within acceptable limits. Typically, the blades are air cooled using, for example, bleed air from a compressor section of the engine. The air may enter near the blade root, and then flow through a cooling circuit formed in the turbine blade. The cooling circuit typically consists of a series of connected passages that form serpentine paths, which increase the cooling effectiveness by extending the length of the air flow path.

The internal cooling system is formed in the blade during its production. For example, if utilizing a lost wax casting process a ceramic core is produced which includes a pattern for the blade internal cooling circuit. The ceramic core is placed in a wax pattern die and wax is injected around the ceramic core to produce a wax pattern of the turbine blade. The wax pattern is dipped in ceramic slurry and dried forming a mold. The mold is then heated and the wax removed therefrom. Next, the mold is placed in a furnace, heated, and filled with a metal material to produce a turbine blade casting. Typically, the metal material is a nickel base superalloy. After the metal material solidifies and the blade is formed, the mold is removed from the blade outer surface and the internal ceramic core is chemically removed leaving internal cavities that form the cooling circuit of the turbine blade.

At times, for example, during research and development, the cooling circuit may need to be modified. Currently, modifications are made by changing the flow circuit pattern in the internal ceramic core die, and then using the modified core die to produce new ceramic cores, which are then used to produce new wax patterns and eventually new cast turbine blades. Although this process yields high quality blades, it suffers from certain drawbacks. Specifically, current modification processes are relatively expensive and extremely time-consuming, taking up to a year to perform. Consequently, schedules for research and development programs may be significantly delayed.

Attempts to overcome the above-mentioned drawbacks generally have not been successful. Most processes have utilized the blade outer surface features to approximate locations of particular internal core features, and modifications have been made based on those approximations. However, in some cases, the internal core floats around within the outer shell during blade production, and the locations of the particular internal flow features are not accurately identified based on the blade outer surface. Thus, because internal cooling circuit modifications need to be extremely precise, these processes have not yielded favorable results.

Hence, there is a need for a method for modifying an internal cooling circuit of a blade that is relatively simple and efficient to employ. Additionally, it is desirable that the method yield high quality blades. Moreover, it is desirable for the method to be relatively inexpensive to practice.

BRIEF SUMMARY

The present invention provides a method for modifying an internal cooling circuit of an airfoil, where the internal cooling circuit includes a flow path configured to direct air through the airfoil in a direction and the airfoil having a leading edge, a trailing edge, and a first and a second wall therebetween, each wall having an inner and an outer surface, the inner surfaces defining a cavity and having features forming at least a portion of the internal cooling circuit.

In one embodiment, and by way of example only, the method includes the steps of forming a pilot hole through the airfoil first and second walls at a predetermined location, forming an insert hole based on the predetermined location, the insert hole enveloping the pilot hole and configured to receive at least a portion of an insert configured to modify the internal cooling circuit flow path, placing the insert into the insert hole, and bonding the insert to the airfoil first and second walls.

In another embodiment, and by way of example only, the method includes the step of forming a pilot hole through the airfoil first and second walls at a predetermined location. Then, the airfoil is examined to determine whether the pilot hole is located at the predetermined location, and if not, the predetermined location is identified relative to the formed pilot hole. An insert hole is then formed based on the located predetermined location that envelops the pilot hole and is configured to receive at least a portion of an insert configured to modify the cooling circuit flow path to redirect the air, where the insert has a width that is greater than a distance between the first and second wall outer surfaces and a first and a second section, each section including a mark. The insert is placed into the insert hole and aligned in the insert hole such that the mark of each section is visible. Then the insert is bonded to the airfoil first and second walls.

In still another embodiment, and by way of example only, the method includes estimating a location on the airfoil outer surface that is the center of an insert hole to be formed on the airfoil outer surface. Then a pilot hole is formed through the airfoil first and second walls, based on the estimated location. Next, the airfoil is examined to determine whether the pilot hole is located at a center of the insert hole to be formed on the airfoil outer surface, and if not, a distance and location of the pilot hole is identified relative to the center. The insert hole is formed in the airfoil, based on the identified distance and location, that envelops the pilot hole and is configured to receive at least a portion of an insert configured to modify the cooling circuit flow path to redirect the air. The insert is placed into the insert hole and bonded to the airfoil first and second walls.

Other independent features and advantages of the preferred method will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
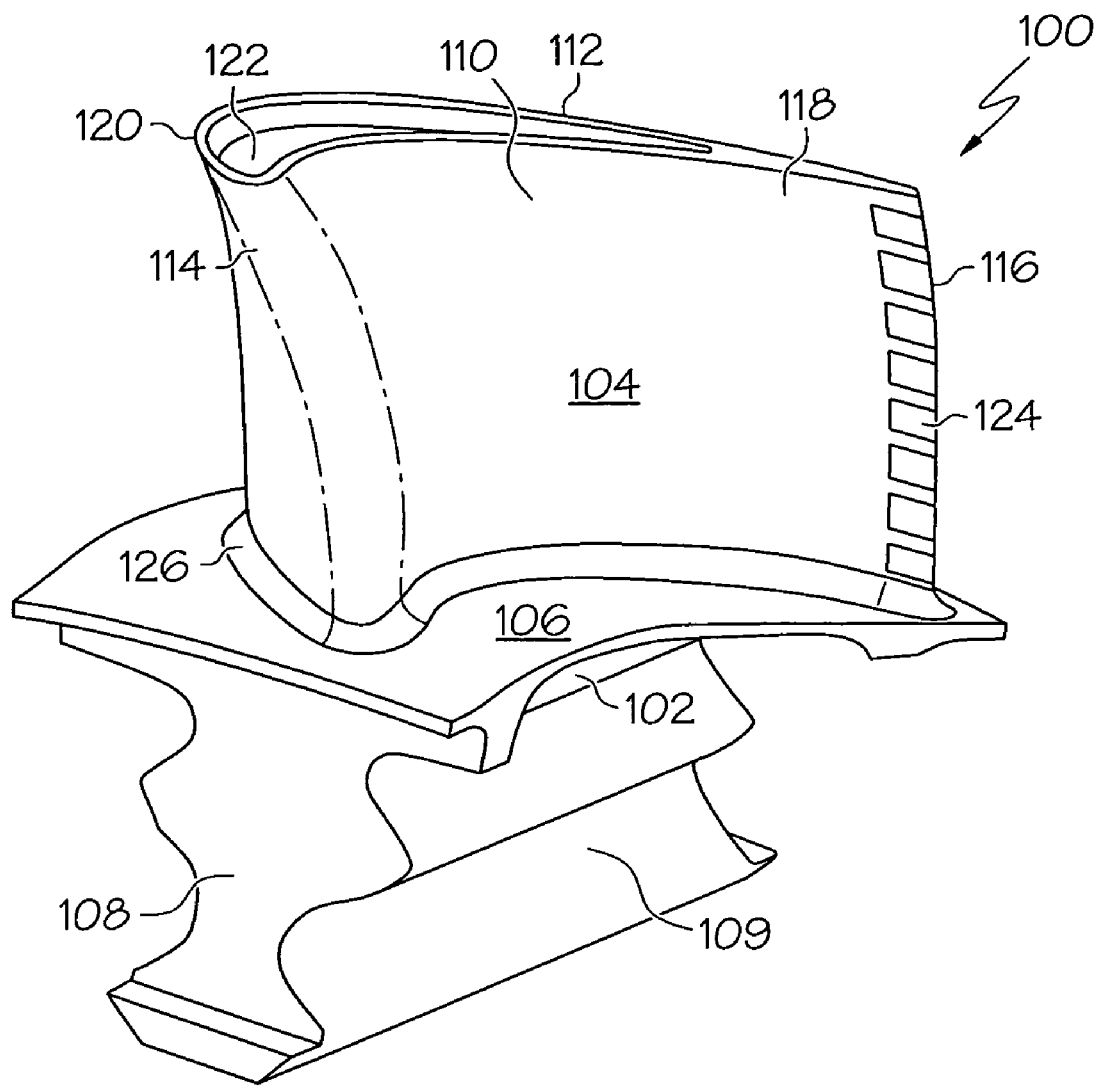
FIG. 1 is a perspective view of an exemplary turbine blade.

FIG. 1 illustrates an exemplary aircraft jet engine turbine rotor blade 100 that includes a shank 102 and an airfoil 104. The shank 102 includes a platform 106 and a root 108. The platform 106 is configured to radially contain turbine airflow. The root 108 provides an area in which a firtree 109 is machined. The firtree 109 is used to attach the blade 100 to a turbine rotor disc (not illustrated). The airfoil 104 has two outer walls 110, 112 each having outer surfaces that together define an airfoil shape. The airfoil shape includes a leading edge 114, a trailing edge 116, a pressure side 118 along the first outer wall 110, a suction side 120 along the second outer wall 112, a blade tip 122, a pressure side discharge trailing edge slot 124, and an airfoil platform fillet 126.

Figure 2:
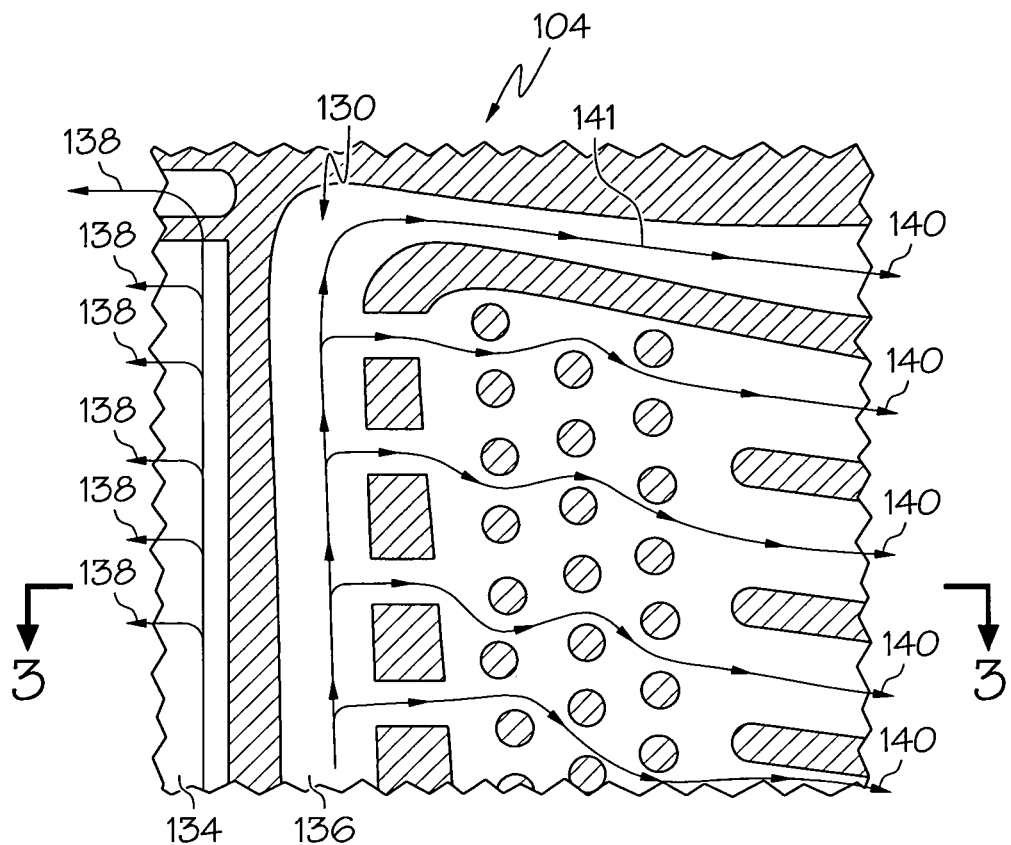
FIG. 2 is a cross sectional view of an exemplary airfoil.
Figure 3:
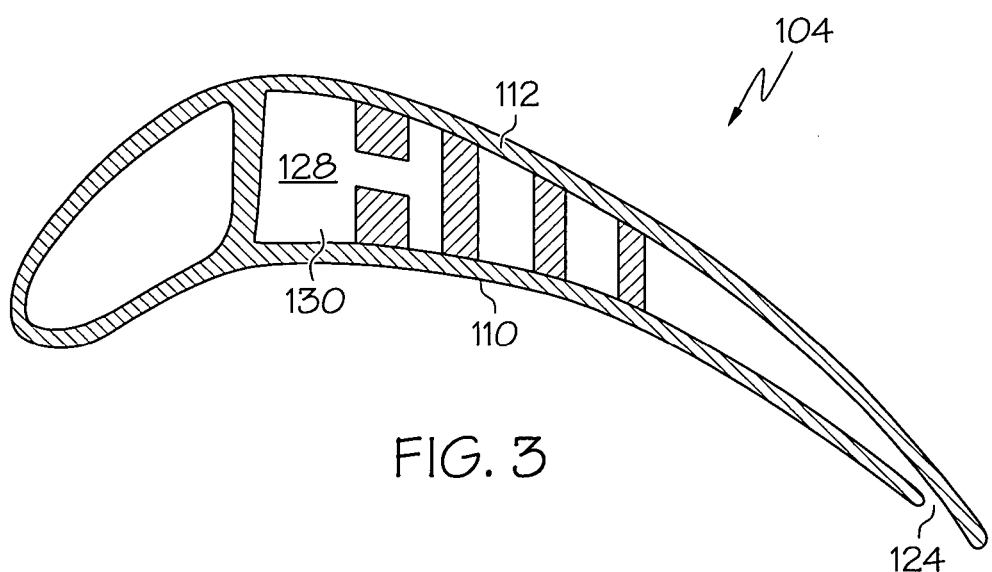
FIG. 3 is another cross-sectional view of the exemplary airfoil taken along line 3-3.

Turning now to FIGS. 2 and 3, an exemplary airfoil 104 is shown in two cross-sectional views. The airfoil 104 includes a cavity 128 therein that is defined by inner surfaces of the airfoil outer walls 110, 112. An internal cooling circuit 130 is disposed in the cavity 128 and includes a plurality of passages disposed in a pattern that is formed by the airfoil outer walls 110, 112, or protrusions that extend therefrom. As shown more clearly in FIG. 3, the passages define at least one flow path. In the exemplary embodiment shown in FIG. 2, the passages are laid out in a pattern having first and second main non-communicating flow paths 134, 136, each having at least five minor flow paths 138, 140, respectively, in communication therewith. It will be appreciated that any number of flow paths laid out in any one of numerous patterns may be employed, and the flow paths may or may not communicate with each other.

Figure 4:
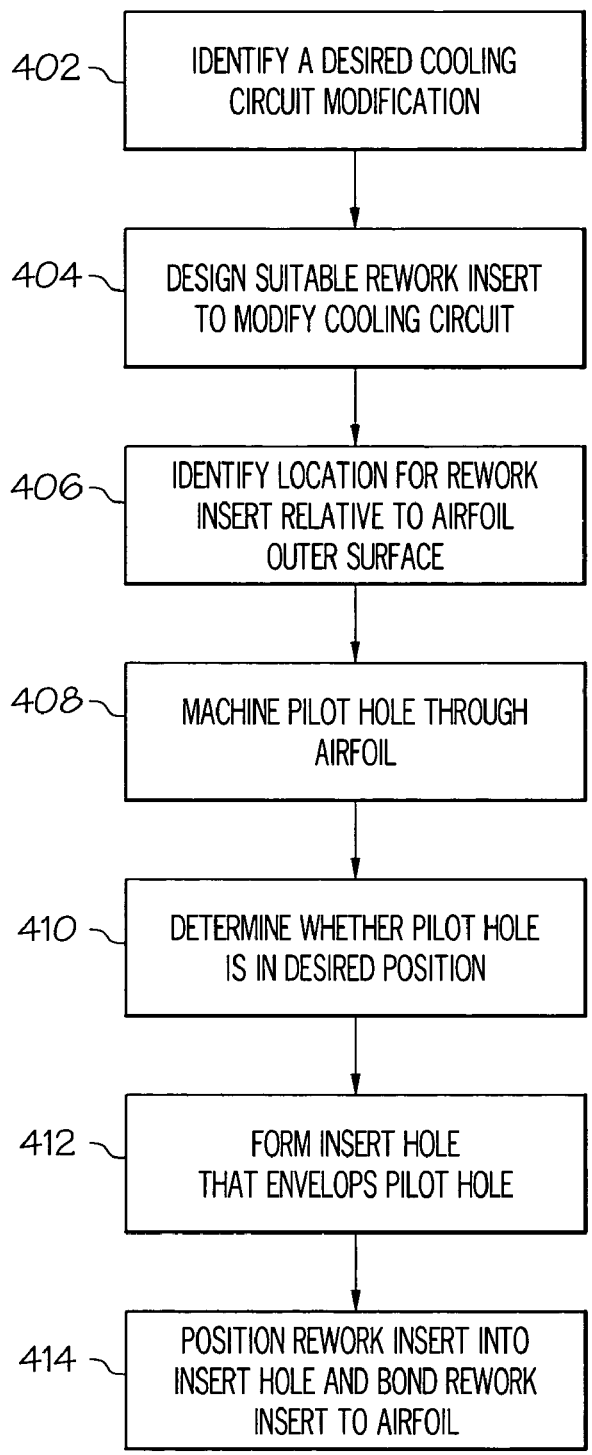
FIG. 4 is a flow diagram of an exemplary method for modifying an internal cooling circuit of the airfoil.

As previously mentioned, the internal cooling circuit 130 at times may need to be modified. FIG. 4 is a flow diagram of an exemplary method 400 for modifying the internal cooling circuit 130. First, a desired cooling circuit modification is identified, step 402. Then, a shape of an insert needed to modify the cooling circuit to the desired modified configuration is designed, step 404. Next, a location for the insert is identified relative to the airfoil outer surface, step 406. A pilot hole is machined through the airfoil, step 408. A determination is made as to whether the pilot hole was formed in the desired position, step 410. Then, an insert hole is formed that envelops the pilot hole, step 412. Next, the insert is positioned in the insert hole and bonded to the airfoil, step 414.

The step of identifying a desired cooling circuit modification, step 402, may be performed in any one of numerous manners. For example, an internal cooling circuit blueprint or suitable schematic showing the various flow paths of the cooling circuit may first be obtained. The blueprint or suitable schematic is then marked to indicate a desired change in the flow paths. In one exemplary embodiment, with reference back to FIGS. 2 and 3, the first main flow path 134 may need to be modified to communicate with one of the minor flow paths 141 of the second main flow path 136 and the second main flow path 136 may need to be blocked from communicating with this same minor flow path 141.

Figure 5:
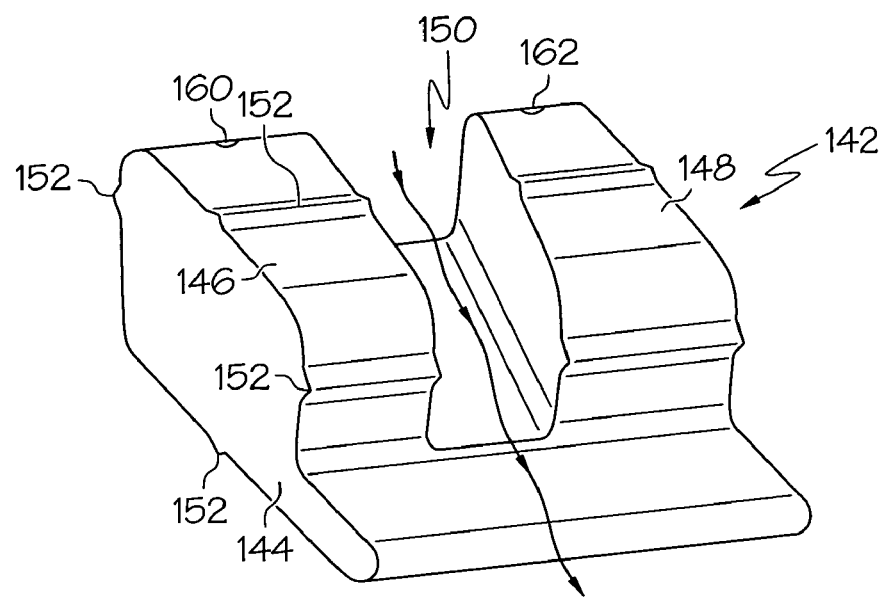
FIG. 5 is an exemplary insert that may be used in the exemplary method shown in FIG. 4.

An insert shape is then designed that will suitably modify the flow paths as desired, step 404. For the example described above, an insert 142, shown in FIG. 5, having a base 144, two walls 146, 148 extending from the base 144, and a channel 150 therebetween, is suitably employed. The base 144 is configured to block air from traveling from the second main flow path 136 to the selected minor flow path 141, while the channel 150 is configured to provide a path for the air from the first main flow path 134 to flow to the selected minor flow path 141. It will be appreciated that a particular shape of the insert 142 depends on the particular desired cooling circuit modification, and multiple inserts may be utilized if necessary to accomplish the desired cooling configuration changes.

No matter the particular shape, however, the width of each insert 142 is preferably greater than the width between the airfoil walls 110, 112. Additionally, each insert 142 preferably includes a plurality of bumpers 152 that protrude from the outer surface thereof. Optionally, the insert 142 may include two marks 160, 162 formed on its outer surface. The marks 160, 162 are configured to provide a guide to allow proper positioning of the insert 142 in the airfoil 104. For example, the marks 160, 162 may be grooves or holes formed in the insert 142.

Figure 6:
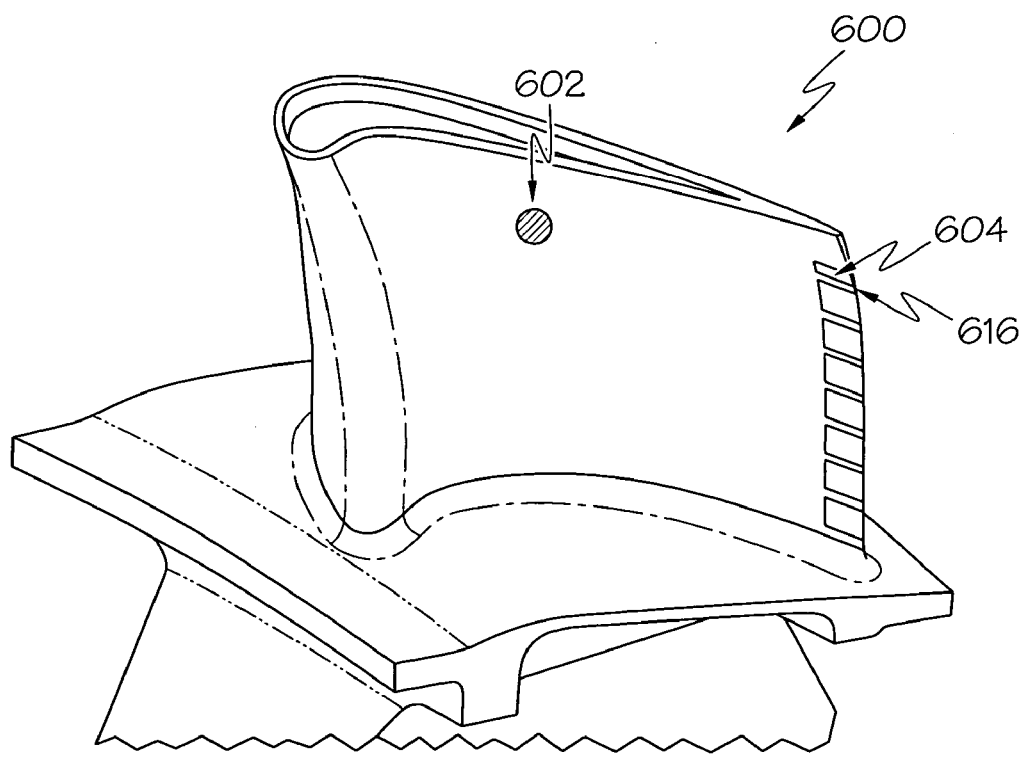
FIG. 6 depicts an exemplary airfoil having a pilot hole formed therein.

After the insert is designed, an approximation is made to determine where the insert 142 should be placed relative to the outer surface of the airfoil 104, step 406. This step may be performed in any one of numerous manners. In one exemplary embodiment, reference is made to a cooling circuit design model or blueprint and an outline of the insert is drawn in the design model or on the blueprint. Then, the center of the insert outline is identified. Next, the position of the insert center relative to airfoil outer surface markings is determined. Preferably, a core printout feature, such as the discharge trailing edge slots 604 in FIG. 6, is used to locate the radial position of the insert center relative to the airfoil outer surfaces, because the core printout features are formed from the same ceramic core that formed the internal cooling passages. A suitable locating feature such as the airfoil trailing edge 616 may be used to approximate a chord-wise coordinate of the insert center.

Then, using the approximated location of the center of the insert position, a pilot hole 154 (see FIG. 7) is machined into the airfoil 104, step 408. Due to variation in the casting process of the airfoil, the core internal cooling features may vary with respect to airfoil external machine features. Thus, the purpose of the pilot hole 154 is to create an airfoil external machined reference feature whose position is known with respect to the features of the airfoil internal cooling circuit, referred to hereinafter as "internal cooling features", that are to be modified. The pilot hole 154 may be formed using any one of numerous techniques, such as, for example, machining, drilling, or using a laser. Preferably, the pilot hole 154 is formed through both the airfoil first and second walls 110, 112. FIG. 6 illustrates a blade 600 having a pilot hole 602 formed therein that is radially positioned relative to a trailing edge slot 604 and that is chord-wise positioned relative to the trailing edge of the airfoil 616.

Figure 7:
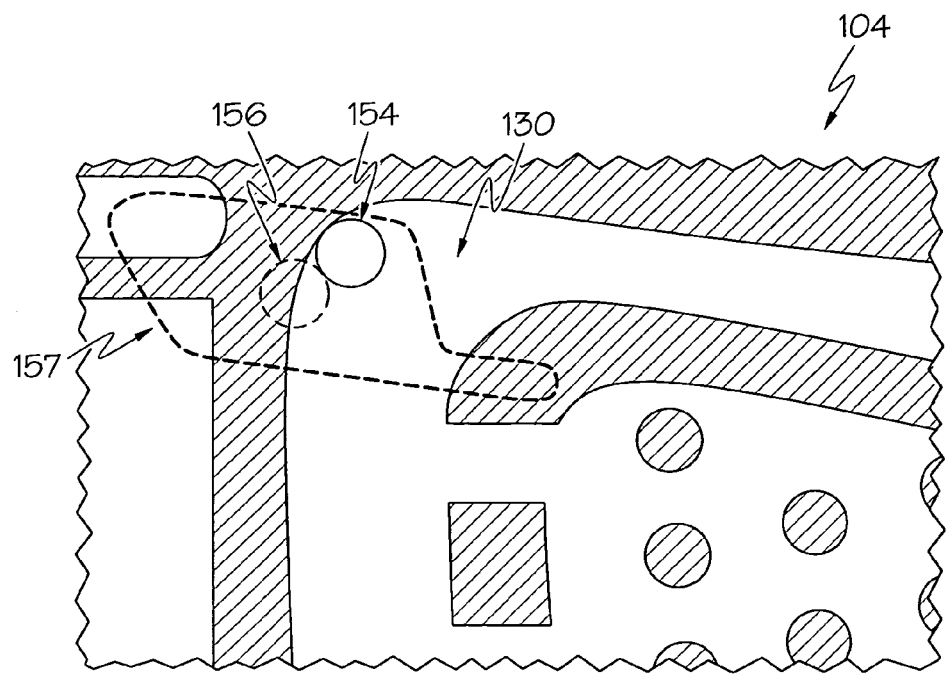
FIG. 7 depicts cross section view of a portion of the exemplary airfoil illustrated in FIG. 6.

To determine whether the pilot hole 154 was formed in the correct location with respect to the internal cooling features, step 410, the positions of the pilot hole and the internal cooling circuit 130 of the actual airfoil 104 are examined. Examination of the internal cooling circuit 130 may be performed in any one of numerous manners, such as, for example, by x-ray, or any other non-destructive technique capable of producing an image of the airfoil internal cooling circuit 130. FIG. 7 shows a portion of the airfoil 104 depicted in FIG. 6 and includes an outline 157 of the desired position of the insert 142 and an identified, predetermined desired position 156 of the pilot hole relative to the actual pilot hole 154. The desired position 156 is the desired location of the pilot hole with respect to cast internal cooling features. The desired position 156 and actual position of the pilot hole 154 are then compared and a distance and location of the desired position 156 relative to the actual pilot hole 154 position are determined.

Figure 8:
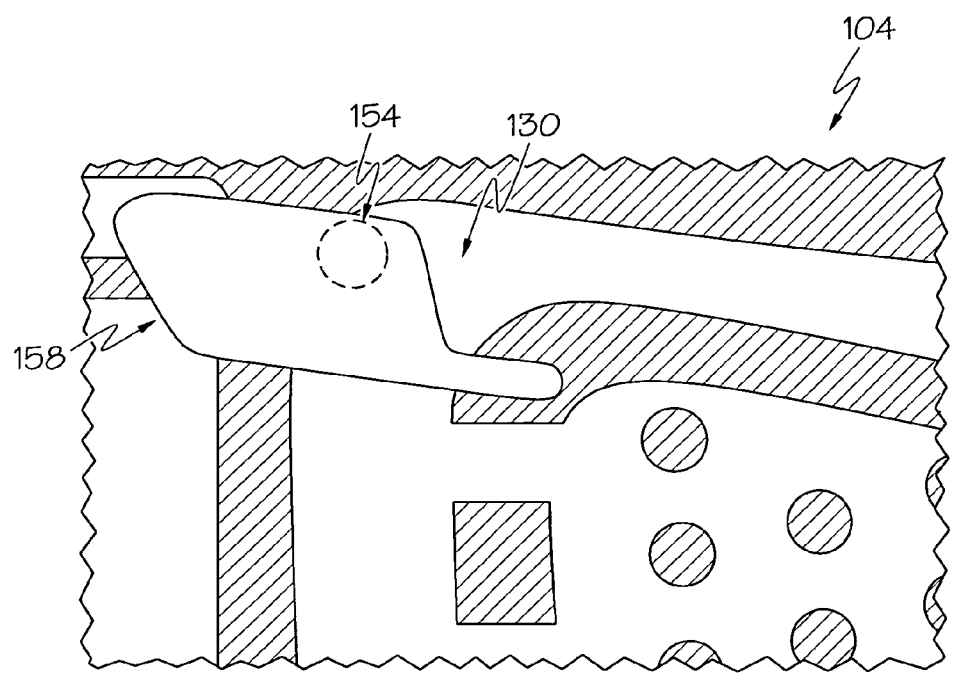
FIG. 8 depicts a cross section view of the portion of the airfoil shown in FIG. 7 during another step of the method shown in FIG. 4.

Using the determined distance and location, a desired insert hole location is identified, and an insert hole 158 (illustrated in FIG. 8) is formed therein. Specifically, the desired position 156 of the pilot hole with respect to cast internal cooling features is identified relative to the machined actual pilot hole 154 and, in one exemplary embodiment, the coordinates of the desired location are programmed into the machine that will be used to make the insert hole 158. The insert hole 158 is then formed and machined in the desired location with respect to the cast internal cooling features. As shown in FIG. 8, the actual pilot hole 154 (shown in phantom) will become enveloped by the insert hole 158, which completes step 412 in FIG. 4. It will be appreciated that insert hole 158 should be appropriately sized to receive the insert 142.

Next, the insert 142 is placed into the insert hole 158 and bonded to the airfoil 104, step 414. After the insert 142 is slid at least partially into the insert hole 158, the insert 142 is pushed until one of the marks 160 formed thereon is visible on one side of the airfoil 104. A wire or suitable retainer can then be inserted and secured into the groove or mark 160 to prevent the insert 142 from sliding too far in one direction. Then, the insert 142 is moved in an opposite direction until both marks 160, 162 are visible. A second wire or suitable retainer can be inserted and secured into the other mark 162 to maintain the insert 142 in a desired position. After the insert 142 is placed in the desired position, it is bonded to the airfoil 104. In one exemplary embodiment, brazing material is injected between a gap formed by the insert bumpers 152, the insert 142, and the airfoil 104. The bumpers 152 may be sized to provide an optimal braze gap of between 0.001 and 0.005 inches. It will be appreciated, however, that the insert 142 may be bonded to the airfoil 104 using any one of numerous other techniques.

The bonded insert 142 can then be machined, step 414. Specifically, the outer surfaces of each of the insert walls 146, 148 are machined flush with the outer surfaces of the airfoil walls 110, 112. Preferably, the insert walls 146, 148 are polished until the outer surface of the airfoil 104 is returned to its original contour.

There has now been provided a simple, precise method for modifying an internal cooling circuit of an airfoil. Additionally, the method is time efficient and relatively inexpensive to perform. Moreover, high quality airfoils are produced using the above-described method.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method for modifying an internal cooling circuit of an airfoil, the internal cooling circuit including a flow path configured to direct air through the airfoil in a direction and the airfoil having a leading edge, a trailing edge, and a first outer wall and a second outer wall extending therebetween, each outer wall having an inner and an outer surface, the inner surfaces (of each) of the first and the second outer walls defining a cavity and having features forming at least a portion of the internal cooling circuit, and the outer surfaces (of each) of the first and the second outer walls forming an outer surface of the airfoil, the method comprising the steps of: forming a pilot hole through the airfoil first and second outer walls at a predetermined location; forming an insert hole based on the predetermined location, the insert hole enveloping the pilot hole and configured to receive at least a portion of an insert configured to modify the internal cooling circuit flow path; placing the insert into the insert hole; and bonding the insert to the airfoil first and second outer walls.

2. The method of claim 1, further comprising the step of determining whether the pilot hole is located at the predetermined location by using an x-ray to determine a position of the pilot hole relative to one or more features of the internal cooling circuit that are to be modified.

3. The method of claim 1, wherein:
the insert has a width that is greater than a distance between the airfoil first and second outer wall outer surfaces; and
the step of bonding the insert comprises machining at least a portion of the insert to conform the insert to at least one of the airfoil first and second outer wall outer surfaces.

4. The method of claim 1, wherein the step of bonding the insert comprises brazing the insert to at least one of the airfoil first and second outer wall outer surfaces.

5. The method of claim 1, wherein the insert includes an outer surface and a bumper formed thereon to provide a gap between the airfoil first outer wall and the insert outer surface when the insert is disposed in the insert hole.

6. The method of claim 5, wherein the step of bonding includes depositing braze material in the gap.

7. The method of claim 1, wherein:
the insert includes a first and a second section, each section including a mark; and
the step of placing further comprises the step of aligning the insert in the insert hole such that the mark of each section is visible.

8. The method of claim 7, wherein the first and second section marks are grooves or holes formed in the insert.

9. The method of claim 8, wherein the step of placing further comprises placing at least a portion of the insert into the insert hole until the first end section mark is visible, inserting a first wire into the first end section mark, re-aligning the insert until the first and second end section marks are visible, and inserting a second wire into the second end section mark.

10. The method of claim 9, further comprising the step of machining the first and second sections to conform the insert to the airfoil outer surface after the step of bonding.

11. The method of claim 1, further comprising the step of examining the airfoil to determine whether the pilot hole is located at the predetermined location, and if not, identifying the predetermined location relative to the formed pilot hole.

12. A method for modifying an internal cooling circuit of an airfoil, the internal cooling circuit including a flow path configured to direct air through the airfoil in a direction and the airfoil having a leading edge, a trailing edge, and a first outer wall and a second outer wall extending therebetween, each outer wall having an inner and an outer surface, the inner surfaces (of each) of the first and the second outer walls defining a cavity and having features forming at least a portion of the internal cooling circuit, the outer surfaces (of each) of the first and the second outer walls forming an outer surface of the airfoil, the method comprising the steps of:

forming a pilot hole through the airfoil first and second outer walls at a predetermined location;

examining the airfoil to determine whether the pilot hole is located at the predetermined location, and if not, identifying the predetermined location relative to the formed pilot hole;

forming an insert hole based on the located predetermined location that envelops the pilot hole and is configured to receive at least a portion of an insert configured to modify the cooling circuit flow path, the insert having a width that is greater than a distance between the first and second outer wall outer surfaces and a first and a second section, each section including a mark; placing the insert into the insert hole and aligning the insert in the insert hole such that the mark of each section is visible; and bonding the insert to the airfoil first and second outer walls.

13. The method of claim 12, further comprising the step of determining whether the pilot hole is located at the predetermined location by using an x-ray to determine a position of the pilot hole relative to one or more features of the airfoil internal cooling circuit that are to be modified.

14. The method of claim 12, wherein the step of bonding the insert comprises machining at least a portion of the insert to conform the insert to the airfoil outer surface.

15. The method of claim 12, wherein the step of bonding the insert comprises brazing the insert to at least one of the airfoil first and second outer wall outer surfaces.

16. The method of claim 12, wherein the insert includes an outer surface and a bumper is formed thereon to provide a gap between the airfoil first outer wall and insert outer surface when the insert is disposed in the insert hole.

17. The method of claim 16, wherein the step of bonding includes depositing braze material in the gap.

18. A method for modifying an internal cooling circuit of an airfoil, the internal cooling circuit including a flow path configured to direct air through the airfoil in a direction and the airfoil having a leading edge, a trailing edge, and a first outer wall and a second outer wall therebetween, each outer wall having an inner and an outer surface, the inner surfaces (of each) of the first and the second outer walls defining a cavity and having features forming at least a portion of the internal cooling circuit, the outer surfaces (of each) of the first and the second outer walls forming an outer surface of the airfoil, the method comprising the steps of:

estimating a location on the airfoil outer surface that is the center of an insert hole to be formed on the airfoil outer surface;

forming a pilot hole through the airfoil first and second outer walls, based on the estimated location;

examining the airfoil to determine whether the pilot hole is located at a center of the insert hole to be formed on the airfoil outer surface, and if not, identifying a distance and location of the pilot hole relative to the center;

forming the insert hole in the airfoil based on the identified distance and location, the insert hole enveloping the pilot hole and configured to receive at least a portion of an insert configured to modify the cooling circuit flow path to redirect the air; placing the insert into the insert hole; and bonding the insert to the airfoil first and second outer walls.

19. The method of claim 18, wherein:

the insert has a width that is greater than a distance between the first and second outer wall outer surfaces; and the step of bonding the insert comprises machining at least a portion of the insert to conform the insert to the airfoil outer surface.

20. The method of claim 18, wherein:

the insert includes an outer surface and a bumper is formed thereon to provide a gap between the airfoil first outer wall and insert outer surface when the insert is disposed in the insert hole; and the step of bonding includes depositing braze material in the gap.

* * * * *